US008820217B2

(12) United States Patent
Doglioni Majer

(10) Patent No.: US 8,820,217 B2
(45) Date of Patent: *Sep. 2, 2014

(54) BREWING UNIT FOR AUTOMATIC COFFEE MACHINES

(75) Inventor: Luca Doglioni Majer, Carate Urio (IT)

(73) Assignee: Rheavendors Services S.p.A. (IT)

(*) Notice: Subject to any disclaimer, the term of this patent is extended or adjusted under 35 U.S.C. 154(b) by 0 days.

This patent is subject to a terminal disclaimer.

(21) Appl. No.: 13/547,141

(22) Filed: Jul. 12, 2012

(65) Prior Publication Data
US 2012/0285333 A1 Nov. 15, 2012

Related U.S. Application Data

(62) Division of application No. 12/304,139, filed as application No. PCT/IB2007/001584 on Jun. 13, 2007, now Pat. No. 8,240,245.

(30) Foreign Application Priority Data

Jun. 14, 2006 (EP) ..................................... 06012333

(51) Int. Cl.
A47J 31/40 (2006.01)
(52) U.S. Cl.
USPC ........................................ 99/302 P; 99/289 R
(58) Field of Classification Search
USPC .......................... 99/302 P, 302 R, 289 R, 297
See application file for complete search history.

(56) References Cited

U.S. PATENT DOCUMENTS

| 4,491,063 | A | | 1/1985 | Grossi |
| 4,784,050 | A | * | 11/1988 | Cavalli et al. ............... 99/289 R |
| 5,622,099 | A | * | 4/1997 | Frei ................................ 99/287 |
| 5,657,683 | A | * | 8/1997 | Sandei et al. .................... 99/287 |
| 6,035,762 | A | * | 3/2000 | Ruckstuhl ....................... 99/295 |
| 6,129,006 | A | * | 10/2000 | Schmed ....................... 99/302 P |
| 6,382,083 | B2 | | 5/2002 | Schmed |
| 6,634,280 | B2 | * | 10/2003 | Sowden et al. .............. 99/302 P |
| 6,711,988 | B1 | | 3/2004 | Eugster |
| 7,017,474 | B2 | | 3/2006 | Comte |
| 7,370,572 | B2 | * | 5/2008 | De'Longhi .................. 99/302 P |
| 7,621,212 | B2 | * | 11/2009 | Carbonini .................... 99/302 P |
| 2001/0050002 | A1 | | 12/2001 | Bonanno |
| 2005/0109223 | A1 | | 5/2005 | Comte |

FOREIGN PATENT DOCUMENTS

EP 1532903 A 5/2005
WO 02/091889 11/2002

* cited by examiner

Primary Examiner — Reginald L Alexander
(74) Attorney, Agent, or Firm — Hess Patent Law Firm LLC; Robert J. Hess

(57) ABSTRACT

The present invention relates to a brewing unit for a coffee machine. The brewing unit comprises a brewing chamber in which a dose of coffee powder can be put, an inlet for supplying water to the chamber for preparing a coffee beverage, a first piston providing a moveable wall for adjusting the chamber internal volume, which wall has an outlet connected to a spout for delivering the coffee beverage to the user, and a valve assembly for connecting said spout to the brewing chamber or the atmosphere according to the position of the supporting means. Advantageously a second piston is provided which moves the first piston and supports the valve assembly. The second piston is also moveable with respect to the first piston, for actuating the valve assembly.

10 Claims, 6 Drawing Sheets

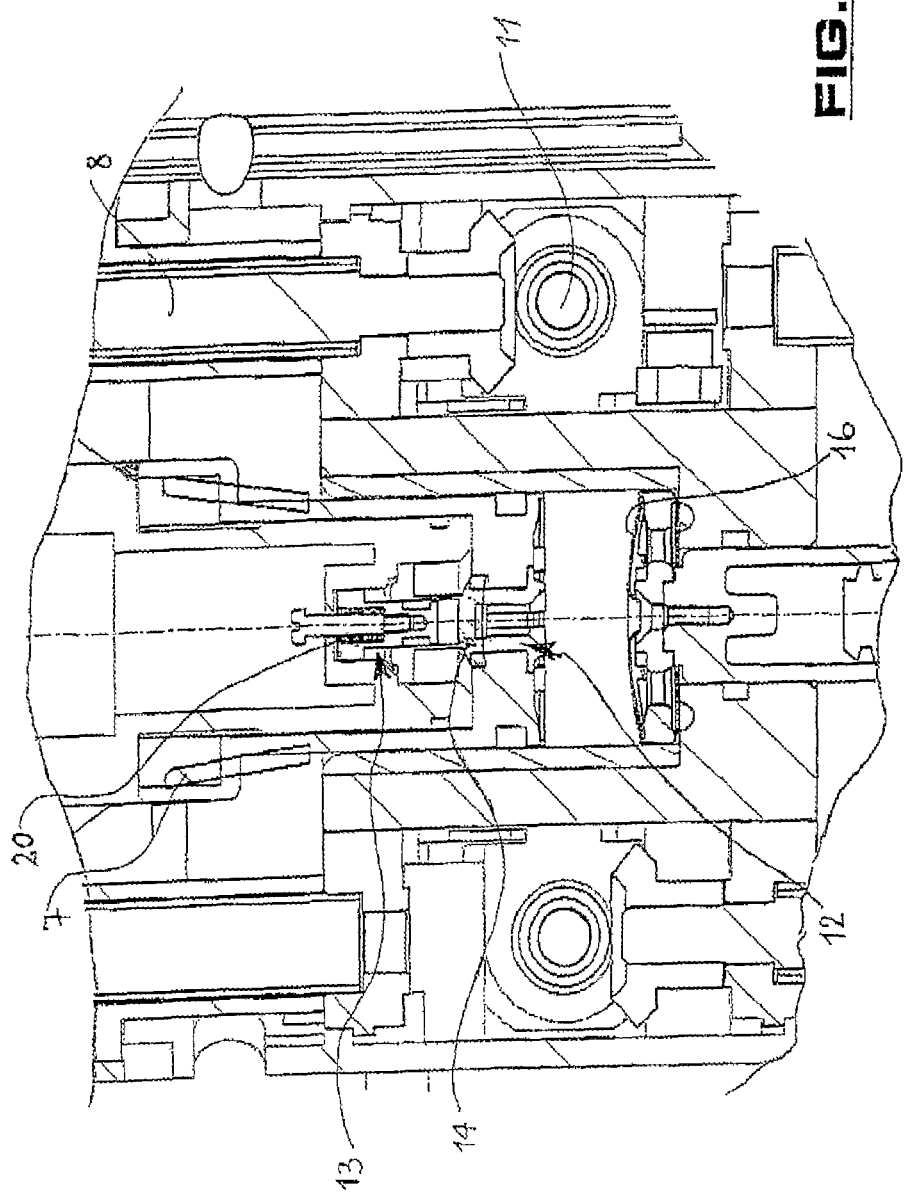

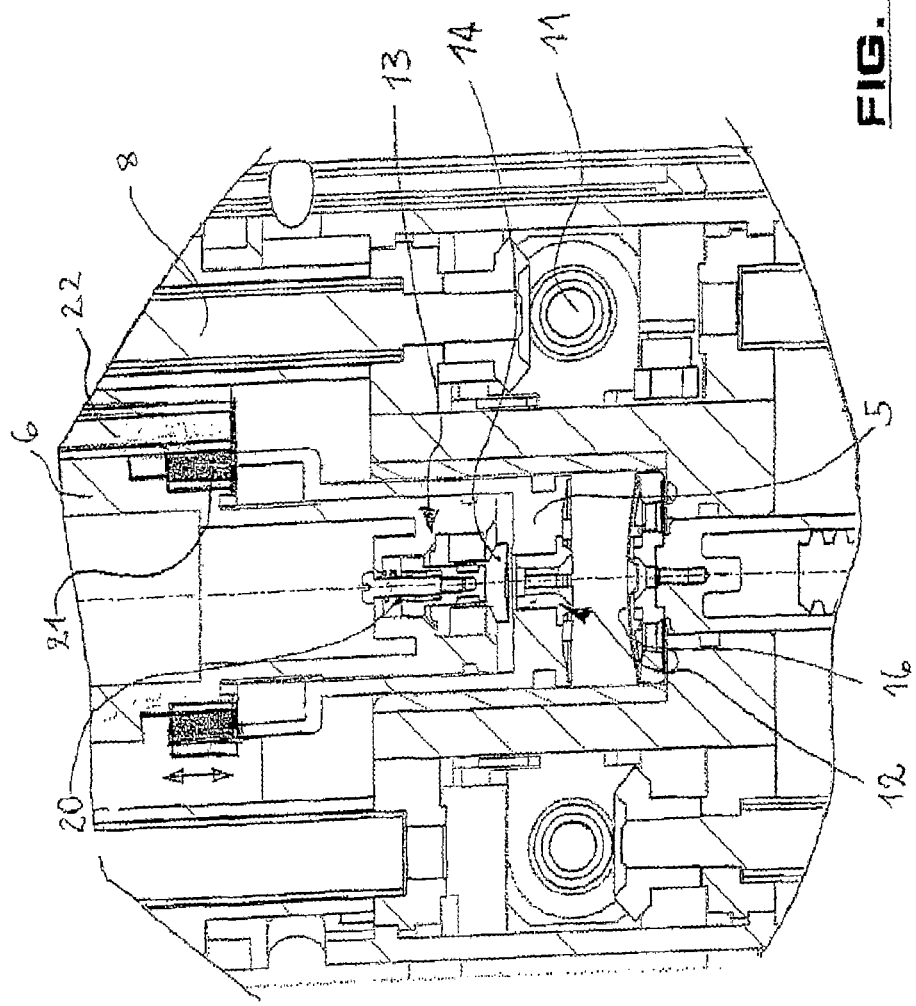

BREWING UNIT FOR AUTOMATIC COFFEE MACHINES

The present invention relates to an improved brewing unit for coffee machines. In particular the invention relates to automatic coffee machines for beverage dispensing, e.g. the so called HoReCa machines. These machines are provided with brewing units including a brewing chamber having a filter element where coffee powder is fed and usually compressed. Hot water is then fed to the chamber for brewing the coffee powder, thereby preparing the coffee beverage which is delivered, through the filter element, to the user.

It is known to provide brewing units with valve assemblies for regulating the outflow of the coffee beverage delivered from the brewing chamber.

WO 02/091889, in the name of DE LONGHI, discloses a filter-holding cup for a coffee machine. The filter-holding cup coupled to the related machine defines a brewing chamber. The cup comprises a spring biased valve arranged downstream from the filter. Most of the time the valve body is kept in a closing position by the spring. Only during operation of the machine, the coffee beverage exiting the filter impinges the valve body against the bias force of the spring, thereby causing the valve body to move axially in an opening position.

In the aforesaid or similar solutions, the coffee flow valve, which is arranged downstream from the brewing chamber, is wetted by the coffee beverage exiting the brewing chamber at each dispensing cycle of the machine.

Residues of the coffee beverage have adhesive properties and build up on the valve seat and the valve body surfaces, acting as a "glue" and eventually causing jamming of the valve body within its seat.

This problem occurs in particular in brewing units wherein the valve body is made of (or covered with) a plastic material, for instance silicone or a similar thermoplastic material. Such material, when soiled by the coffee delivered from the brewing chamber, easily adheres to the seat, thereby keeping the valve assembly in a closed position.

In order to avoid jamming of the valve assembly, the valve body is often removed by the final user of the coffee machine or the maintenance operator.

In other words, prior art coffee machines affected by the aforesaid problem are often tampered for removal of the valve body. Therefore, operation of the coffee machines changes with respect to the parameters preset by the manufacturer and the quality of the delivered coffee is lowered. In fact "espresso" coffee is usually prepared by brewing in a chamber substantially closed, while "americano" coffee is prepared by brewing in a chamber having its exit open.

U.S. Pat. No. 6,382,083, in the name of SCHMED, discloses a brewing unit for coffee machines provided with a valve assembly inserted between the brewing chamber and the beverage outlet in order to control the flow rate of the coffee beverage. The valve assembly comprises a valve body member movable against the force of a spring between a first position, wherein the valve body does not close the seat but leaves a minimum gap, and a second position, wherein the valve body still does not close the seat and leaves the maximum gap. The spring is set to keep the valve body member in the open position.

By adjusting the bias force of the spring, the user changes the extension of the gap between the valve body and the related seat, this causing changes in the amount of coffee to be brewed per time unit. Italian patent IT 1142041, in the name of GROSSI, discloses a brewing unit wherein a valve is positioned in a passage provided in the filter element for regulating the outflow of the coffee beverage prepared in the brewing chamber. This valve has a valve body which is axially movable and has size and the shape such that, during preparation of the coffee beverage, it does not close the outlet passage of the filter element but leaves an annular gap. Presence of such annulus gap should prevent malfunctioning of the brewing unit due to clogging of the filter element.

Brewing units similar to those disclosed in U.S. Pat. No. 6,382,083 and IT 1142041, do not allow for closing the valve and relevant pressure build-up within the brewing chamber to e.g. prepare an espresso coffee.

Thus, there is the need for a brewing unit which allows for closing of the valve assembly downstream from the brewing chamber and, at the same time, prevents jamming of the valve body.

It is an object of the present invention to provide a brewing unit for coffee machines which overcomes the drawbacks of known solutions, being at the same time easy to manufacture and assemble and inexpensive.

It is still an object of the present invention to provide an easy to operate brewing unit for coffee machines which avoids jamming or clogging of the coffee outlet valve assembly.

It is another object of the present invention to provide a brewing unit for coffee machines which overcomes the drawbacks related to soiling of the valve assembly arranged downstream from the brewing chamber, being at the same time easy to clean.

These and other objects are achieved by the present invention which relates to a brewing unit according to claim 1.

Advantageously the brewing unit according to the present invention prevents adhering of the valve to the surfaces of the related seat, in the delivery outlet.

The second piston, which supports the first piston and the valve assembly, remains in the first position when the brewing unit is not operating. In other words the first position of the second piston is also its starting position for the operation and corresponds to the valve assembly being spaced and separate from the delivery outlet. In this way the valve assembly, and in particular the valve body, is not subject to adhesion to the delivery outlet surfaces due to the effect of the coffee residues, nor is it affected by building up of residues next to the valve assembly.

Preferably the second piston and the first piston are arranged coaxially and are moveable along the same axis, for instance sliding within guides. The second piston is actuated by any suitable device, for example a motorized endless screw engaging a guide of the same piston.

The stroke of the second piston is transmitted to the first piston for pushing its end portion, which comprises the aforesaid wall, against the coffee powder contained into the brewing chamber. The moveable wall compresses the coffee powder to the desired level.

The first piston and the second piston are coupled by means of one or more resilient elements, such as springs. The resilient elements are designed to resist a preset threshold compression force without deforming and to be themselves compressed if the force exceeds such threshold.

When the first piston has compressed the coffee powder to the desired level of pressure, and the second piston still forwards toward the first piston, the resilient elements yield, thereby allowing the second piston to bring the valve assembly into contact with the delivery outlet surfaces, so as to close the same. Movement of the second piston backward, toward its first position, causes the resilient elements to return to their initial extension, while the first piston is still, thereby separating the valve assembly from the delivery outlet, so as to open the same. Further backward movement of the second piston is transmitted to the first piston by the extended resilient elements and the same first piston is moved a correspondent distance from the compressed coffee powder.

The brewing unit according to the present invention permits to prepare both "espresso" coffee beverages and "americano" coffee beverages.

An "espresso" coffee beverage can be prepared by operating the brewing unit to comprise the following steps:
- providing a dose of coffee powder into the brewing chamber;
- moving the second piston from its starting first position toward the brewing chamber to push the first piston (its moveable wall) against the coffee powder to achieve desired compression of the same;
- moving the second piston toward the first piston, i.e. applying a relative motion of the second piston with respect to the first piston, until the second piston reaches the second position, thereby closing the delivery outlet with by way of the valve assembly;
- supplying water to the brewing chamber; and
- moving the valve away from the delivery outlet, thereby opening the same and allowing the coffee beverage to exit the brewing chamber once a sufficient pressure is reached in the brewing chamber.

An "americano" coffee beverage can be prepared by operating the brewing unit to comprise the following steps:
- providing a dose of coffee powder into the brewing chamber;
- moving the second piston from its starting first position toward the brewing chamber to push the first piston against the coffee powder to achieve the desired compression of the same;
- moving the second piston back to leave a gap between the valve body and the valve seat and between the compressed coffee and the movable wall;
- supplying water to the brewing chamber while keeping the delivery outlet open, thereby allowing the coffee beverage to exit the brewing chamber.

The valve assembly always remains in an open configuration when the brewing unit is in stand-by, i.e. when the unit is not operative. In this way the valve body cannot adhere to the surfaces of the delivery outlet, thereby overcoming the adhesion effect of the coffee residues.

The valve body contacts the surfaces of the delivery outlet when the brewing unit is operated for delivering an "espresso" coffee, but only for a time necessary for the preparation process or for a time pre-set.

In other words, according to a first embodiment, the valve can remain closed upon action of a spring having a closing force that is less than the force of the beverage pressure within the brewing chamber: once a sufficient pressure is reached, the valve is opened against the spring force.

According to a second embodiment, the valve is open by moving the second piston—and the valve mounted on it—away from first piston, that remains still, i.e. that does not move with respect to the brewing chamber.

According to third embodiment, the valve is opened by an actuator known in the art that operates the valve after a pre-set time has lapsed. Suitable actuators are e.g. electromagnets, or similar elements, acting on the valve body.

When the brewing unit is operated for delivering an "Americano" coffee, the valve body may contact the delivery outlet surfaces for a short time lapse because of the movement of the second piston pushing the first piston for compressing the coffee powder, but the same valve is removed from the outlet when the second piston is withdrawn before brewing of the coffee powder.

Alternatively, the valve is opened by command of an actuator, that is operated by the machine control unit to provide a brewing chamber with coffee compressed between two pistons and having a brewing chamber open outlet.

The brewing unit according to the present invention is compatible with common coffee machines. In particular, the brewing unit of the invention can be installed in automatic coffee machines for home or office use, or to be installed in food-service sites or in so called HoReCa (Hotel-Restaurant-Café) sites or, still, in public areas. Since the brewing unit overcomes jamming of the valve assembly at the exit of the brewing chamber, maintenance of the related coffee machines is simpler with respect to machines provided with prior art units, with evident advantages for what concerns the operating costs.

A further advantage of the presence of an actuator for opening the valve by command, is that the brewing time can be accurately controlled to increase the quality of the beverage.

Further advantages and features of the present invention will become apparent from the following detailed description with reference to the drawings enclosed as a non-restrictive example, where:

FIGS. 4 and 5 are enlarged views of the valve assembly in the open and closed conditions;

FIG. 6 shows a valve assembly provided with a valve actuator to open or close the valve when required.

Figure 1:
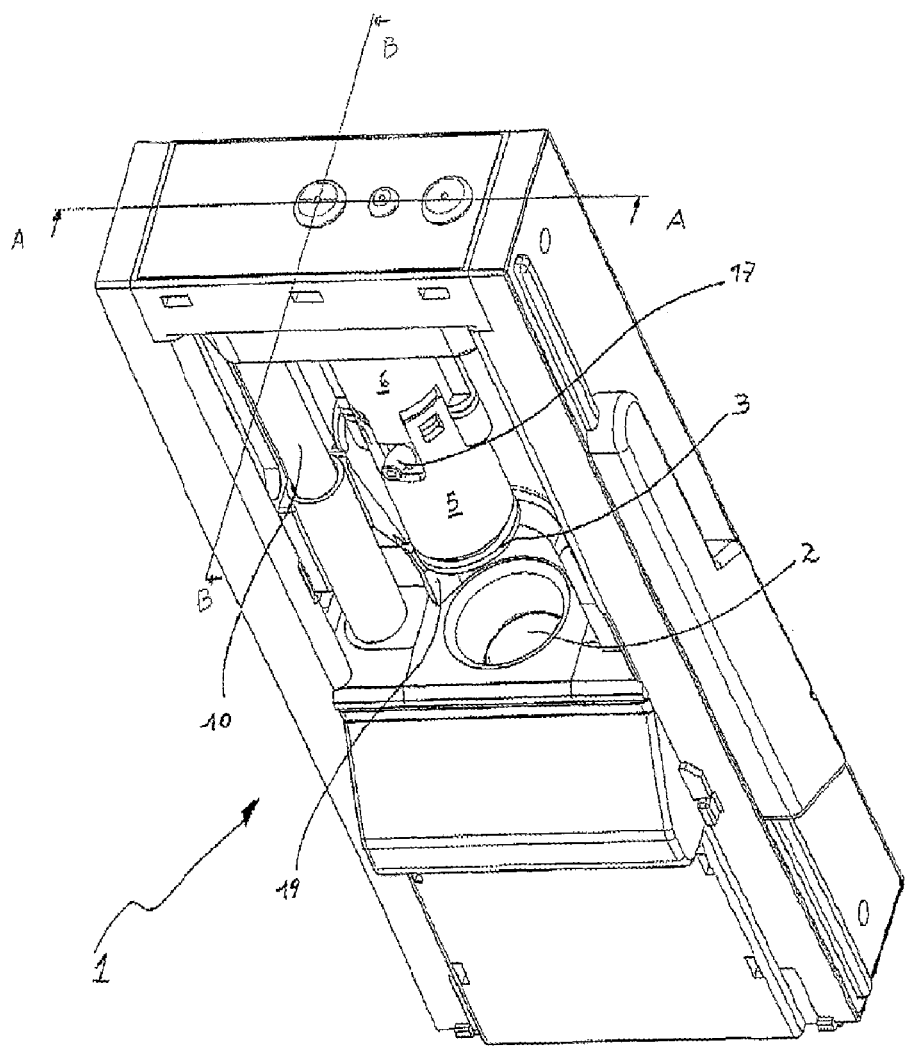
FIG. 1 is a perspective view of a brewing unit according to the present invention.

With reference to FIG. 1, the brewing unit 1 according to the present invention comprises a brewing chamber 2, having a top wall 3 and a bottom wall 16; top wall 3 is moveable to adjust the chamber internal volume. The brewing chamber is intended to house a dose of coffee powder supplied, through the chute 4, by an external unit, for instance a grinding unit of the coffee machine (not shown).

Moveable wall 3 is normally including a filter (not shown) and is a portion of a first piston 5 which is arranged to move with respect to the brewing chamber 2 so as to press the coffee powder contained therein and close the chamber 2 during the brewing process.

An outlet 12 for the brewed coffee is provided through the wall 3. The outlet 12 is a through hole usually connected to a plurality of recesses provided on the surface of wall 3, under the filter, to collect the beverage.

Figure 2:
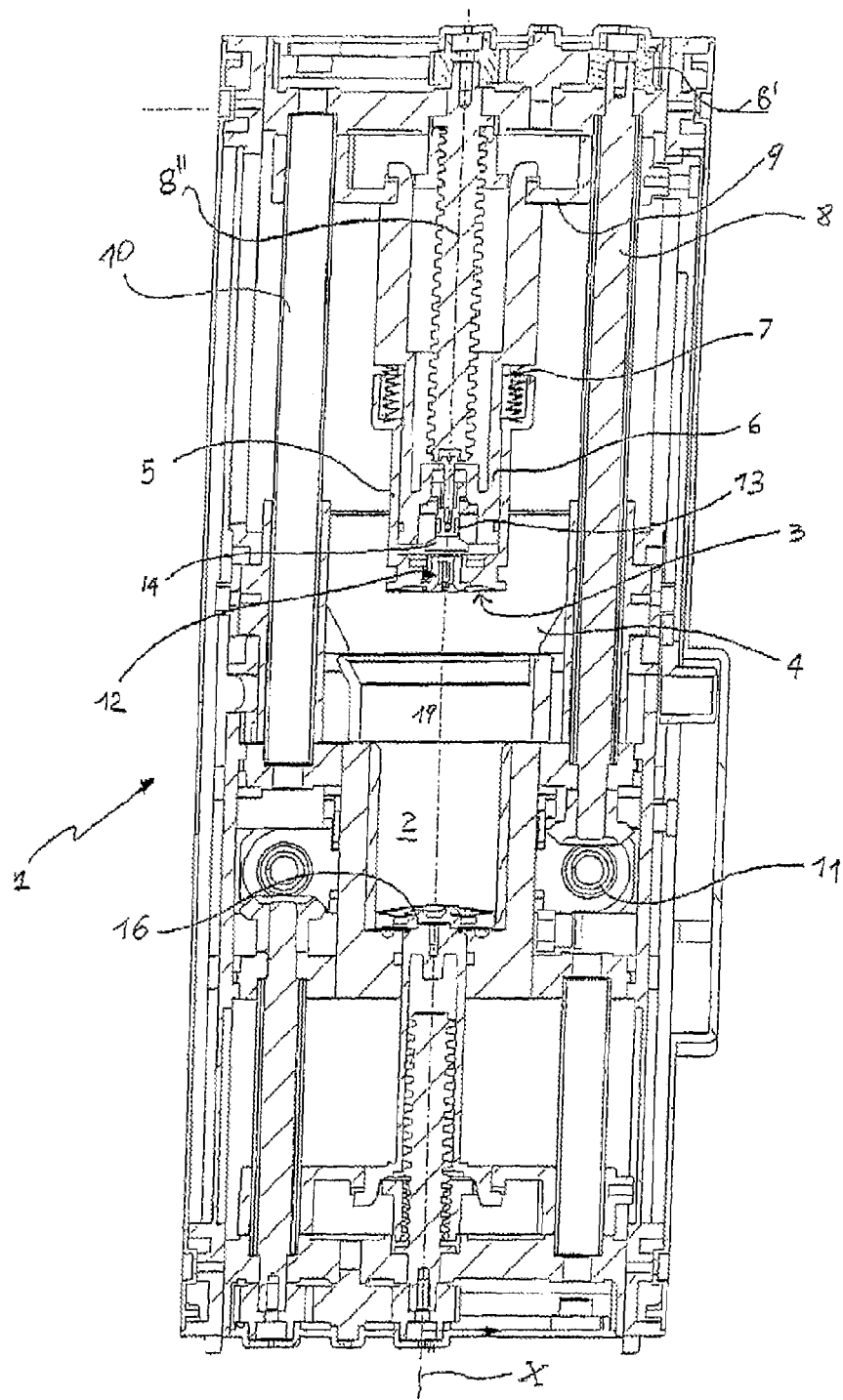
FIG. 2 is a cross section view along line A-A of FIG. 1.

The first piston 5 has a generic cylindrical shape to match the shape of the brewing chamber 2 and moves along the axis X shown in FIG. 2 to open/close the chamber and press the coffee powder. The first piston 5 is moved along the axis X by a second piston 6 to which piston 5 is coupled by coupling means that allow to move first piston 5 with respect to second piston 6.

Figure 3:
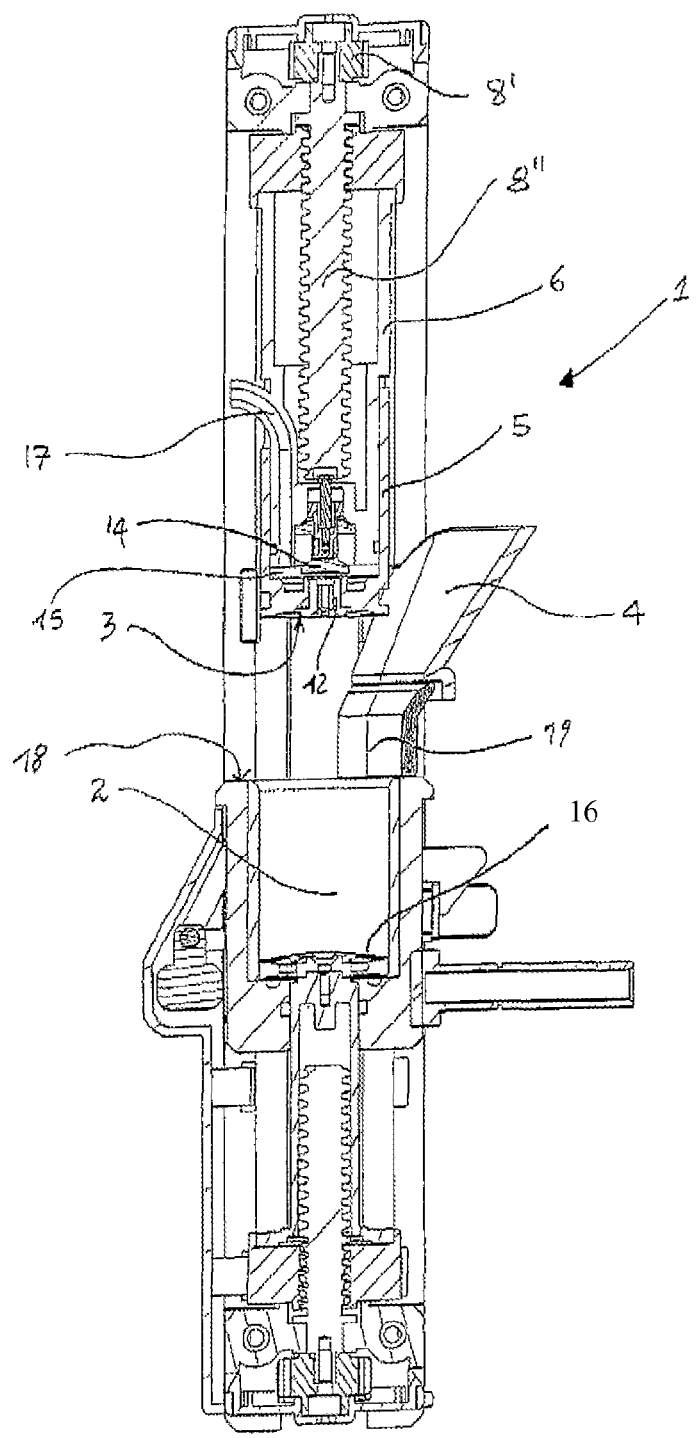
FIG. 3 is a cross section view along line B-B of FIG. 1.

In the embodiment shown in FIGS. 2-3, the coupling means are resilient elements 7, preferably a couple of springs.

A portion of the second piston 6 is slidingly inserted into first piston 5 so as to leave a gap 15 between the wall 3 of the first piston 5 and the lower external surface of the same second piston 6 when the unit is not in use.

A valve assembly 13 is provided on second piston 6 and is movable with it along axis X-X and with respect to first piston 5. Valve 13 is positioned at the gap 15 between the first piston 5 and the second piston 6 for opening and closing the delivery outlet 13 of the wall 3.

Preferably the valve assembly 13 comprises a spring biased valve body 14.

Such valve body 14 is shaped to match with the surfaces defining the delivery outlet 12. In the embodiment shown in the figures, valve body 14 is made of or comprises a covering of silicone or other similar material. The valve body 14 is intended to be able to close delivery outlet 12 by abutting the facing internal surface of wall 13. The valve body can be more or less deformable under pressure; in one embodiment, valve body 14 can be deformed by the brewed coffee pressure within chamber 2 and let out coffee upon being deformed. Preferably, the valve body will withstand the pressure in the brewing chamber without deforming; opening the outlet is obtained by compression of spring 20 (see FIGS. 4 and 5).

The second piston 6 is arranged coaxial with the first piston 5 and is coupled to an actuating device controlled by the related coffee machine. It is understood that the actuating device can be any suitable known device for imparting the movement to the second piston 6 along the axis X-X.

In the embodiment shown in the figures, the actuating device comprises an endless screw 8, engaging an element 9 jointed to the second piston 6, and a guide 10 also engaging in a slidable way the element 9. The endless screw 8 is rotated by a gear 11 controlled by the coffee machine control unit. Rotation of the endless screw 8 causes the rotation of a plurality of gears 8' that rotates a second endless screw 8" so that second piston 6 is translated a correspondent stroke along the axis X.

Bottom wall 16 can be moved within chamber 2 in a similar way by corresponding gears and screws (FIG. 2).

In FIGS. 1-3 the second piston 6 is shown in its first position, which corresponds to piston 6 being raised upon the brewing chamber 2 a sufficient distance to keep the wall 3 of the first piston 5 far from the brewing chamber 2, so as not to close the same chamber. When the second piston 6 is in this first position a dose of coffee powder can be dropped into the brewing chamber 2.

Operation of the brewing unit 1 will be explained in the following with reference to the preparation of an "espresso" coffee beverage.

Once the coffee powder is supplied into the brewing chamber 2, the second piston 6 is moved, by endless screws 8, 8" and gears 8', from its initial first position along the axis X, toward the same brewing chamber 2. The first piston 5 moves with the second piston 6 so as to bring the wall 3 against the coffee powder and achieve the desired pressing of the same powder.

Figure 4:
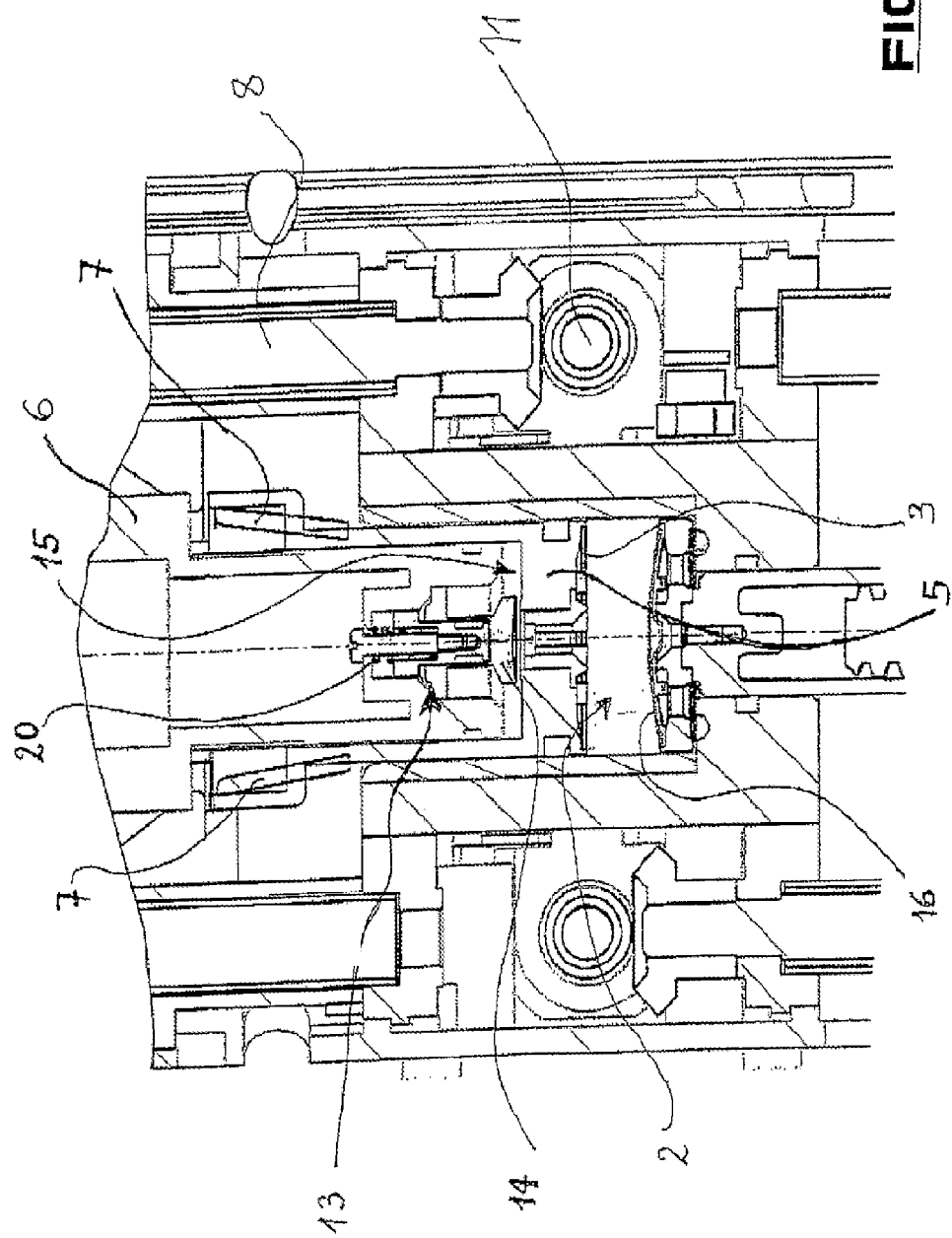

The first piston 5 is pressed against the coffee powder until the resilient elements, i.e. the springs 7, are compressed between the first piston 5 and the second piston 6. When the springs 7 yield, the first piston 5 remains still, while abutting the pressed coffee pastille within the chamber 2, and the second piston 6 moves forward, toward the chamber, thereby reducing the gap 15. This position is shown in FIG. 4.

Further movement downwards of the second piston 6 against the first piston 5 causes the valve assembly 13 to operate, i.e. the second piston 6 moves into a second position at which the valve body 14 closes the delivery outlet 12, as shown in FIG. 5.

In this configuration, the coffee powder is pressed within the brewing chamber 2 and the valve body 14 of valve assembly 13 closes the outlet 12.

Water is fed to the brewing chamber through a suitable channel (not shown) provided on the wall 16 opposite to the wall 3.

Delivery of the brewed coffee from the brewing chamber 2 by opening of the outlet 12, can be obtained in different possible ways. In one embodiment, opening 12 is opened because the pressure of the liquid in chamber 2 is greater than the force of spring 20 that biases valve body 14 away from valve assembly 13.

In another embodiment, valve assembly is operated by an actuator such as an electromagnet.

In other embodiments, outlet 12 is opened by moving piston 6 upwards, i.e. away from piston 5.

In one of these further embodiments, once brewing of the coffee has been carried out, this usually occurring in a preset time lapse, the second piston 6 is moved backward by a counter-rotation of the endless screws 8, 8', thereby releasing springs 7 from compression and maximizing gap 15. This causes the valve assembly 13 to open the delivery outlet 12. The coffee beverage exits the brewing chamber 2 and is channelled toward the spout 17 for delivering to the user.

FIG. 6 shows a further embodiment wherein in lieu of springs 7 a rotating gear 21, operated by screw 22, is provided on piston 5 and is meshing with teeth provided on piston 6. In this embodiment, the volume of brewing chamber 2 can be kept constant because the screws 8, 8" are not operated while screw 22 is rotated to operate gear 21. In this way, wall 3 will not move while piston 6 is moved away from it to open outlet 12. Accordingly, piston 5 can thus remain in a position of "coffee compressed" and valve 13 can be opened to give a coffee as resulting from a mix of espresso and americano steps (i.e. compressed coffee and open outlet).

After the coffee has been delivered, second piston 6 is further withdrawn toward its first position (FIG. 3), so that the brewing unit is ready for another preparation cycle. The springs 7 are now completely extended and the first piston 5 has been lifted together with the second piston 6.

Discharge of the residual coffee pastille is achieved by raising the wall 16, which is also moveable in a manner known per se, to be flush with the surface 18. A motorized arm 19 is operated and pushes the residual pastille toward a discharge. The wall 16 is lowered in position for another preparation cycle.

The skilled person will appreciate that when the brewing unit 1 is not operating, the valve body 14 is not in contact with the delivery outlet surfaces. Adhering of the valve body 14 to such surfaces is thus prevented, and maintenance of the brewing unit 1 results simpler with respect to prior art units.

Operation of the brewing unit 1 will be explained in the following with reference to the preparation of an "americano" coffee beverage.

Once the coffee powder is supplied into the brewing chamber 2, the second piston 6 is moved with the first piston 5, by the rotating endless screws 8, 8" from its initial first position to the brewing chamber 2. The wall 3 of the first piston 5 can either close the brewing chamber 2 without pressing the coffee powder, thereby stopping a distance from the powder, or press the powder and being moved back a length sufficient to leave a gap between the powder and the same wall 3. In both cases the internal volume of the brewing chamber 2 is adjusted to be greater than the volume of the same chamber 2 when an espresso coffee is prepared. It is understood that the valve body 14 does not close the delivery outlet 12 during the brewing process, i.e. when water is supplied into the chamber 2. The coffee exits the chamber through the open outlet 12 and is channelled to the spout 17 for delivery to the user.

The residual coffee powder is discharged as previously mentioned.

The first position of the second piston 6 is such that the valve assembly 13, coupled to the first piston 5, stands separate from the delivery outlet surfaces during the stand-by of the brewing unit. This allows for minimizing the build up of hard residues at the outlet 12 and the valve body 14. The coffee beverages exiting the chamber 2 provide cleaning of the outlet 12 and the valve body 14 from soft residues.

The brewing unit 1 is simple to manufacture and inexpensive. The pistons 5 and 6 can be made of a thermoplastic material, for instance ABS plastic. The same pistons 5 and 6 are shaped so as to allow easy coupling and disassembly, thereby promoting easy cleaning of such components from residues.

The invention claimed is:

1. A brewing unit (1) for a beverage preparing machine comprising: a brewing chamber (2), a first piston (5) providing a mobile wall (3) of said chamber, said mobile wall (3) having an outlet (12) and a spout (17) for delivering the beverage from said brewing chamber (2), and a valve assembly (13), and means (6) for supporting said piston (5) and said valve assembly (13), said supporting means (6) being movable with said first piston (5) with respect to said brewing chamber (2) and being also movable with said valve assembly (13) with respect to said first piston (5), for actuating said valve assembly (13) to respectively connect said spout (17) to said brewing chamber (2) or to the atmosphere, according to the position of said supporting means (6).

2. The brewing unit according to claim 1, wherein said supporting means is a second piston (6) coaxial with and partially housed in said first piston (5).

3. The brewing unit according to claim 2, wherein said valve assembly (13) is mounted on an end wall of said second piston (6) overlying said moveable wall (3) of the first piston.

4. The brewing unit according to claim 3, wherein said first piston (5) and said second piston (6) are moveable along a common axis (X) and a portion of said second piston comprising said end wall is movable, along said axis, in a portion of said first piston comprising said moveable wall.

5. The brewing unit according to claim 2, wherein said first piston (5) and said second piston (6) are biased in a spaced position by means of resilient means.

6. The brewing unit according to claim 4, wherein said valve assembly (13) comprises a spring (20) biased valve body (14) arranged parallel to said common axis (X) of movement of said pistons.

7. The brewing unit according to claim 2, wherein when said valve assembly is provided with actuating means (21, 22) located on said first piston.

8. The brewing unit according to claim 7, wherein said actuating means comprises gear means (21) connected to teeth provided on said second piston (6) to move said second piston with respect to said first piston (5).

9. The brewing unit according to claim 4, wherein said second piston is moved along said common axis by an actuating device.

10. An apparatus for preparing a brewed beverage, comprising a beverage preparing and dispensing machine having a brewing unit (1) that includes a brewing chamber (2), a first piston (5) providing a mobile wall (3) of said chamber, said mobile wall (3) having an outlet (12) and a spout (17) for delivering the beverage from said brewing chamber (2), and a valve assembly (13), and means (6) for supporting said piston (5) and said valve assembly (13), said supporting means (6) being movable with said first piston (5) with respect to said brewing chamber (2) and being also movable with said valve assembly (13) with respect to said first piston (5), for actuating said valve assembly (13) to respectively connect said spout (17) to said brewing chamber (2) or to the atmosphere, according to the position of said supporting means (6).

* * * * *